United States Patent [19]
Fletcher et al.

[11] 3,737,762
[45] June 5, 1973

[54] APPARATUS AND METHOD FOR MEASURING THE SEEBECK COEFFICIENT AND RESISTIVITY OF MATERIALS

[76] Inventors: James C. Fletcher, Administrator of the National Aeronautics and Space Administration with respect to an invention of; Vaclav Hadek, 3246 North Mount Curve, Altadena, Calif. 91007

[22] Filed: Aug. 26, 1971

[21] Appl. No.: 175,267

[52] U.S. Cl. .................................324/32, 73/15 R
[51] Int. Cl. ...........................G01r 5/28, G01r 31/00
[58] Field of Search ..............................324/32, 62 R; 73/15 R, 94

[56] References Cited

OTHER PUBLICATIONS

Hadek et al.; "Metal Chamber . . . "; Rev. Sci. Instrum.; Vol. 38; pg. 991-992; 1967
Still et al.; "A Modified . . . "; Rev. Sci. Instrum.; Vol. 41; No. 6; June 1970
La Flamme, P. M.; "Electrical Conductivity . . . "; Rev. Sci. Instrum.; Vol. 35; No. 9; Sept. 1964; pg. 1193-1196

Primary Examiner—Rudolph V. Rolinec
Assistant Examiner—Ernest F. Karlsen
Attorney—Monte F. Mott, Wilfred Grifka and John R. Manning

[57] ABSTRACT

Apparatus for measuring the thermoelectric properties of materials under high pressure, including a pair of force transmitting assemblies constructed of thermally and electrically conductive material positioned between the ram and anvil of a press. Each force transmitting assembly has a small diameter pressing portion for contacting a face of the sample so that the sample can be squeezed between them. Each assembly also includes a heat exchanger to maintain the sample face at a controlled temperature, and an electrical conductor to carry current generated by the sample. A sleeve of thermally and electrically insulative material closely surrounds the pressing portions of the two assemblies to confine the sample and to help align the two pressing portions. A bellows surrounds the pressing portions of the assemblies and a vacuum pump can evacuate the enclosed region.

2 Claims, 3 Drawing Figures

VACLAV HADEK
INVENTOR.

APPARATUS AND METHOD FOR MEASURING THE SEEBECK COEFFICIENT AND RESISTIVITY OF MATERIALS

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to apparatus and methods for measuring the electrical properties of materials.

One type of thermoelectric generator employs wafers of semiconductive materials whose opposite faces are maintained at different temperatures to cause the generation of a voltage between the faces. Typically, only a low voltage is generated and therefore care must be taken to provide very low resistance connections at the opposite faces of the wafer. One method for providing good electrical contact involves pressing conductors against the wafer faces with a very high pressure. In the testing of materials to determine which are suitable for use as the thermoelectric wafer elements, measurements are made of the resistivity and Seebeck coefficient of the material under the expected operating conditions of the generator. The Seebeck coefficient is the open circuit voltage per degree of temperature difference (Kelvin) between the faces of the element where there are junctions to outside conductors. In order to make measurements of material samples, apparatus must be provided for measuring the voltage and resistivity of a sample of the material when it is compressed at a very high pressure, and when it is in a desired atmospheric and temperature environment. The problems of making measurement are often compounded where the materials are initially in a powderlike form.

One method which has been employed to make measurements of electrical properties of materials for thermoelectric generators involves first pressing a quantity of material to be tested into a wafer of suitable size. The flat surfaces of the wafer are then coated with vacuum deposited metallic electrodes. The specimen is then placed in a press or vise to apply the required contact pressure, and measurements are made of the Seebeck coefficient and resistivity. While such apparatus can be used, difficulty is experienced in closely controlling the temperatures of the different wafer junctions as well as the atmospheric environment. In addition, some trouble and expense is encountered in pressing the material into a wafer with suitably flat and parallel faces, depositing contacts on the faces and applying equal pressures over all regions of the faces during testing.

Another method that has been utilized involves placing a quantity of the material to be tested on the anvil of a press and lowering the ram of the press to apply the required contact pressure. In order to retain the material in a controlled area of the anvil, a flexible holder such as an O-ring surrounds the sample. However, the flexible containers often do not remain sufficiently flexible at very high or very low temperatures and difficulty has often been experienced in retaining an accurate amount of material within the flexible holder and in maintaining the faces of the press that contact the sample accurately parallel.

SUMMARY OF THE INVENTION

In accordance with one embodiment of the present invention, apparatus is provided which can quickly measure the Seebeck coefficient and resistivity of samples of materials under a variety of environmental conditions. The apparatus includes a pair of force transmitting assemblies which can be placed between the ram and anvil of a press and which have small diameter pressing portions that can compress a sample of material to be tested. Each of the assemblies is constructed of metal, so that it is a good thermal and electrical conductor. Each assembly also has a heat exchanger for enabling close control of its temperature, so that a desired temperature difference can be maintained between the two faces of the sample. A sleeve of material which is thermally and electrically insulative surrounds the pressing portions of the assemblies to confine the material to the pressing portions while maintaining them insulated from each other. The pressing assemblies also have larger cylindrical areas near the pressing portions that are surrounded by the opposite ends of an insulative aligning sleeve that helps to maintain them in close alignment. A stiff metal sleeve surrounds the aligning sleeve to resist deformation of it. A bellows surrounds the pressing portions of the assemblies and has opposite ends sealed to them to enable close control of the atmosphere in which the sample is compressed.

A powdered or granulated sample may be tested by depositing a measured quantity of it on the pressing portion of a first force transmitting assembly while it is surrounded by the confining sleeve to prevent loss of the sample. The other assembly is then positioned above the first one and the bellows is fully attached. Prior to compression of the sample, the region within the bellows may be evacuated to resist oxidation of the sample by surrounding air and also to help drive off any oxygen within the sample. While the vacuum is maintained, the force transmitting assemblies are pressed together at a controlled pressure. Heating and/or cooling fluids are passed through the heat exchangers of the assemblies to maintain the faces of the samples at predetermined temperatures. The Seebeck effect can be measured by measuring the voltage across the two assemblies that are in contact with the opposite faces of the sample. The resistivity at any chosen temperature can be measured by maintaining both assemblies at the same temperature and measuring the voltage drop of a given current passed through the assemblies by way of the sample.

The novel features of the invention are set forth with particularity in the appended claims. The invention will be best understood from the following description when read in conjunction with the accompanying drawings.

DESCRIPTION OF THE PREFERRED EMBODIMENT

Figure 1:
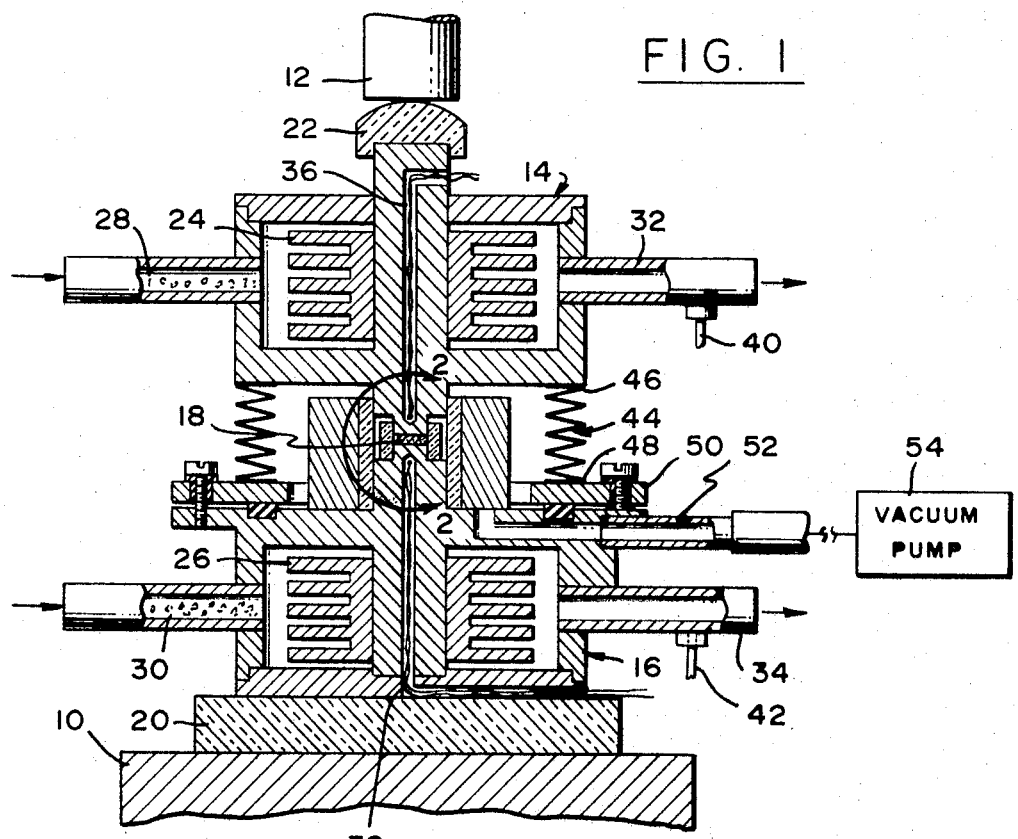
FIG. 1 is a sectional side view of apparatus constructed in accordance with the invention.

The Figures illustrate apparatus that can be mounted in a hand or hydraulic press of a type which has an anvil 10 and ram 12 that can be pressed together with a controllable force. Two force transmitting assemblies, or force transmitters 14, 16 are mounted on the press between the anvil and ram for converting the force into a high pressure upon a small sample 18 that is to be tested. The force transmitters 14, 16 are constructed primarily of a metal so that they are highly conductive to heat and to electricity. In order to insulate the assemblies from the press, a lower insulator 20 is provided which supports the lower force transmitter 16 on the anvil, while an upper insulator 22 is provided which transmits force from the press ram 12 to the upper force transmitter 14.

One type of measurement which can be performed with the apparatus is the measurement of the Seebeck coefficient of a material. The Seebeck coefficient indicates the open-circuit voltage that will be generated across the faces of a sample for a predetermined temperature difference across the faces of the sample. In order to provide a difference in temperature at the faces of the sample 18, each force transmitter 14, 16 includes a heat exchanger 24, 26. A hot or cold fluid can be passed through inlets 28, 30 of the force transmitters, that lead to the heat exchangers, and the fluids can be carried away through outlets 32, 34 so that rapid heating or cooling to a wide range of temperatures can be achieved. Each force transmitter includes a thermocouple apparatus 36, 38. The actual thermocouples are located near the portions of the force transmitters that press against the sample 18, so that the measured temperatures are very close to the temperatures at the faces of the sample. Wires from the thermocouple apparatuses 36, 38 extend to temperature-indicating meters (not shown) which can be monitored to adjust the flow and/or temperature of the heating or cooling fluids entering the heat exchangers. In order to measure the current generated by the sample 18, electrical leads 40, 42 are attached to the force transmitters. The force transmitters may be constructed of a material such as copper to provide extremely good thermal and electrical conductivity.

The atmosphere in which the sample is tested can be controlled by the provision of a bellows 44 which has one end 46 permanently sealed to one of the force transmitters 14 and another end 48 sealed to a clamp 50 that can be rapidly attached and detached from the other force transmitter 16. A conduit 52 is provided in the lower force transmitter 16 to enable control of the atmosphere within the bellows 44. In many cases, the sample is compressed and tested under a high vacuum environment, and in these cases the conduit 52 is connected to a vacuum pump 54 that can draw out the air.

Figure 2:
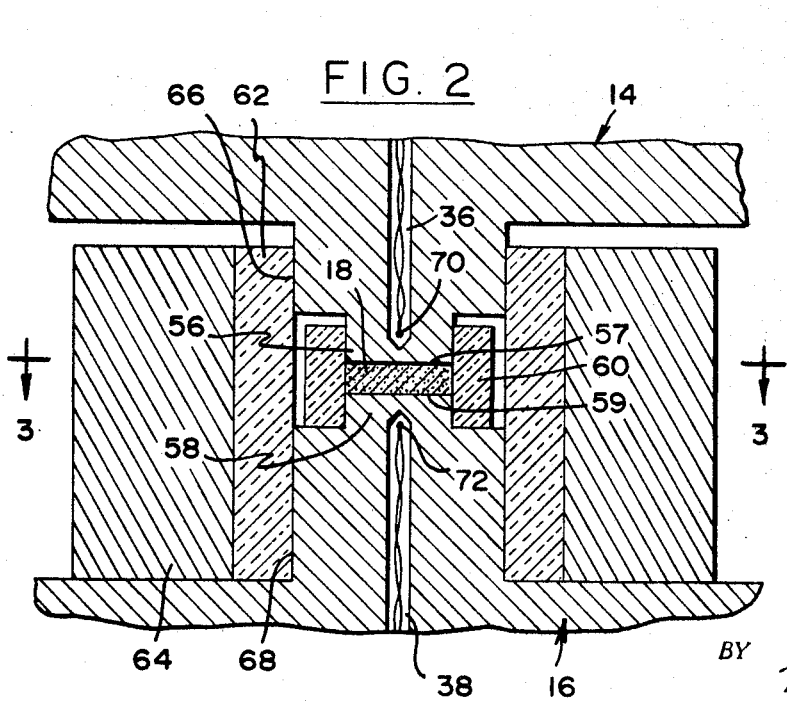
FIG. 2 is a view of the area 2-2 of FIG. 1.
Figure 3:
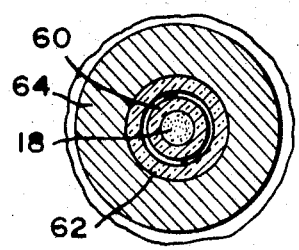
FIG. 3 is a view taken on the line 3-3 of FIG. 2.

FIG. 2 shows some details of the region of the apparatus where the sample 18 is located. Generally, a small sample of material is utilized and therefore force must be supplied over only a small area. Each of the force transmitters 14, 16 has a pressing portion 56, 58 of cylindrical shape having the same diameter as that of the sample 18 that is to be compressed, and contacting the opposite faces 57, 59 of the sample. In order to hold the sample in place, a retaining sleeve 60 is provided which closely surrounds the two cylindrical pressing portions 56, 58 and is therefore in contact with them. The retaining sleeve 60 is constructed of a material which is thermally and electrically insulative, so that it conducts a minimum of heat and current between the two pressing portions. This enables the maintenance of the two pressing portions at different temperatures and also helps to assure that virtually no electricity flow between them that could effect the measured voltage. The insulative sleeve 60 rests upon the lower force transmitter 16 and is generally of a short enough length that it is not compressed between the two force transmitters 14, 16 even when the sample is fully compressed.

In compressing the sample 18, it is desirable that the faces of the pressing portions 56, 58 be maintained parallel to one another. The retaining sleeve 60 helps to maintain such parallelism, but it is generally insufficient by itself. Its insufficiency arises partly because materials which are good electrical and thermal insulators generally are either not stiff enough or are too brittle and fragile. Of course, a simple tough metal sleeve cannot be utilized by itself, because it would conduct heat and electricity. In order to keep the two pressing portions accurately aligned and with their faces parallel, an additional set of sleeves 62, 64 which serve as aligning sleeves, are provided. In addition, the force transmitters 14, 16 are formed with cylindrical piston-like regions 66, 68 larger than the pressing portions 56, 58 and located behind them.

One of the aligning sleeves 62 is constructed of a thermally and electrically insulative material, and is dimensioned so that its opposite ends closely receive the piston portions 66, 68 of the two force transmitters. The other aligning sleeve 64 is thick and is constructed of a material that is stiff and tough over a wide range of temperatures. Often, a metal such as stainless steel is appropriate for this use. The outer aligning sleeve 64 closely surrounds the inner insulative sleeve 62 to provide backing for it that allows it to maintain the piston portions 66, 68 of the two force transmitters in close alignment, and therefore to maintain the two pressing portions 66, 68 in close alignment. The aligning sleeves 62, 64 are both constructed short enough so that they are not axially compressed by the force transmitters even when the sample 18 is fully compressed.

In order to test a sample for its Seebeck coefficient and resistivity, the bellows clamp 50 is disconnected and the upper force transmitter 14 is lifted off the lower force transmitter 16. The aligning sleeves 62, 64 may also be removed, but the retainer sleeve 60 remains in a position to surround the pressing portion 58 of the lower force transmitter. In many cases, the sample may be in a powder or granule-like form. A measured quantity of the sample is placed on the lower pressing portion 58 and is held therein by the sleeve 60. The apparatus is then assembled by installing the aligning sleeves 62, 64 and installing the upper force transmitter 14 over the lower one with the entire apparatus in the press as shown. Prior to compressing the sample, the vacuum pump 54 may be run so as to evacuate the area surrounding the sample. As mentioned above, this helps to minimize oxidation of the sample. In many cases, a thermoelectric generator that is to be constructed will be designed for use under vacuum conditions, and the vacuum pump can create such conditions during the test. When the sample is to be tested in some other atmosphere such as in an inert gas, a supply of such gas may be connected to the bellows-enclosed region through the conduit 52, sometimes after first purging the region.

After thus preparing the apparatus, the ram 12 of the press is lowered to produce the desired pressure for the test. Although a very high pressure may be required on the faces of the sample, the required force can be transmitted through the insulators 20, 22 even if the insulators are relatively weak, because the forces can be distributed over large areas of the insulators. Force gauges (not shown) indicating the force applied by the press, can be utilized to calculate the pressure at the faces of the sample. In order to create the desired temperatures at the faces of the sample 18, heating and/or cooling fluids are circulated through the heat exchangers 24, 26. In tests where both faces of the sample are to be maintained at a low temperature, a fluid such as vaporized liquid nitrogen or helium may be used. In those tests where the Seebeck coefficient is to be measured, fluids are circulated to the heat exchangers so as to maintain closely controlled different temperatures across the sample faces. The temperature at each sample face can be accurately measured by the thermocouples 36, 38 whose actual thermo-couple junctions 70, 72 are located within the pressing portions 56, 58 of the force transmitters. It may be noted that a considerable thickness of conductive material is present between each heat exchanger 24, 26 and the pressing portions 56, 58. This helps to minimize fluctuations in temperature at the pressing portions if there are fluctuations in temperature of the heating or cooling fluids, and also assures that the thermocouples are at very nearly the same temperature as the pressing portion faces that are in contact with the sample. With the faces of the sample at closely controlled different temperatures, the Seebeck coefficient of the material can be determined by measuring the voltage at the two leads 40 and 42 that are connected to the force transmitters. Where it is desired to measure the resistivity of a sample with both of its faces at the same temperature, this can be accomplished by connecting a current source to the leads 40, 42 to pass a current through the sample and by measuring the resulting voltage drop.

After each test run of a sample, the sample can be removed and a sample of another material tested with a minimum of delay and effort. The fact that thin film leads do not have to be deposited upon the faces of the sample and it does not have to be first pressed into a wafer shape prior to placement in the pressing machine allows for more economical and more rapid testing. The apparatus also assures accurate control of the pressure on the sample, the environment of the sample during the test, and the flatness and parallelism of the faces of the sample. The ease with which samples can be initially compressed and tested under vacuum conditions, helps to assure minimum oxidation and maximum purities of the samples. The apparatus is useful for testing a wide variety of materials, including semimetals, semiconductors and others where only a low voltage may be present across the sample faces, and high pressure contacts are employed to accurately measure the voltage.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for use with a press to measure electrical properties of a sample under pressure comprising:

first and second force transmitters for disposal between the ram and anvil of a press, and said force transmitters having small piston-like pressing portions for pressing against a sample and second piston portions of larger diameter than the pressing portions, each force transmitter constructed of electrically and thermally highly conductive material and having an electrical lead in electrical communication with its pressing portion, and each force transmitter having temperature regulating means for regulating the temperature of the pressing portion;

a first sleeve of electrically and thermally insulative material extending between and closely surrounding said piston-like pressing portions of said first and second force transmitters, to confine a sample being pressed between faces of said pressing portions and to help keep the pressing portions in alignment;

a second sleeve of electrically and thermally insulative material extending between and closely surrounding said second piston portions of said transmitters, to keep them closely aligned; and a third sleeve of stiff material which is electrically and thermally conductive closely surrounding said second sleeve to resist its deformation.

2. Apparatus for measuring the Seebeck coefficient of material placed under pressure between the ram and anvil of a press comprising:

a pair of insulators constructed of material which is thermally and electrically insulative, for respectively resting against said ram and anvil of said press;

a pair of force transmitter assemblies, each including a first end for resting against one of said insulators, each of said assemblies constructed of thermally and electrically highly conductive material, having a hollow inner portion and an inlet and outlet leading to said inner portion for passing a temperature regulating fluid through said inner portion, and an electrical terminal for carrying current;

the second end of each force transmitter assembly forming a piston-like pressing portion of a constant diameter along its length which is smaller than said first end for applying a high pressure to a sample;

a pair of thermocouple means respectively extending into said force transmitter assemblies to individually measure their temperatures near said pressing portions; and an insulative sleeve for disposal closely about said pressing portions of said force transmitter assemblies to confine material between the pressing portions.

* * * * *